Dec. 19, 1922.

W. F. COOPER.
PLAYER PIANO.
FILED OCT. 5, 1917.

Inventor
William F. Cooper
By Brown, Hanson & Boettcher
Attorneys.

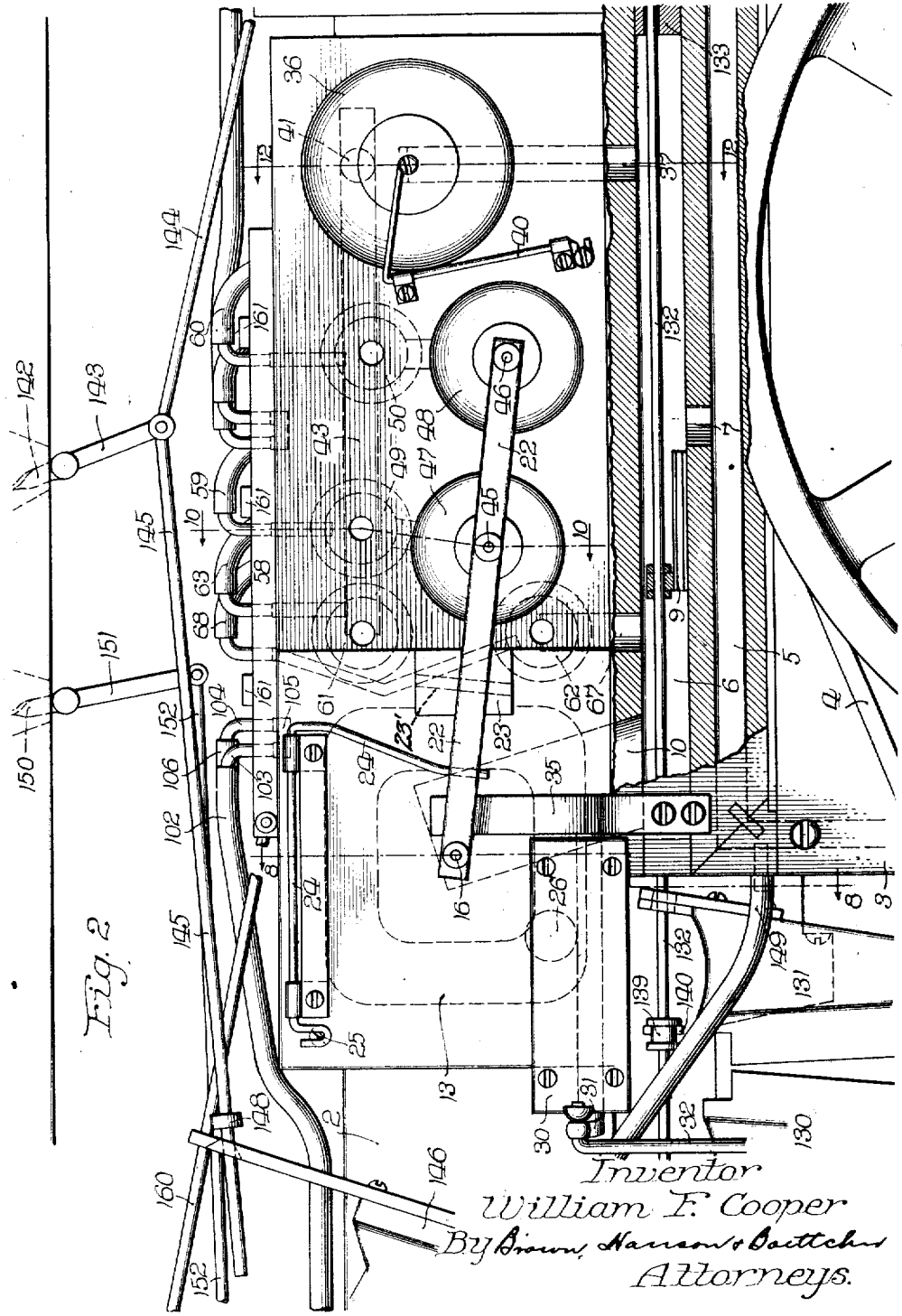

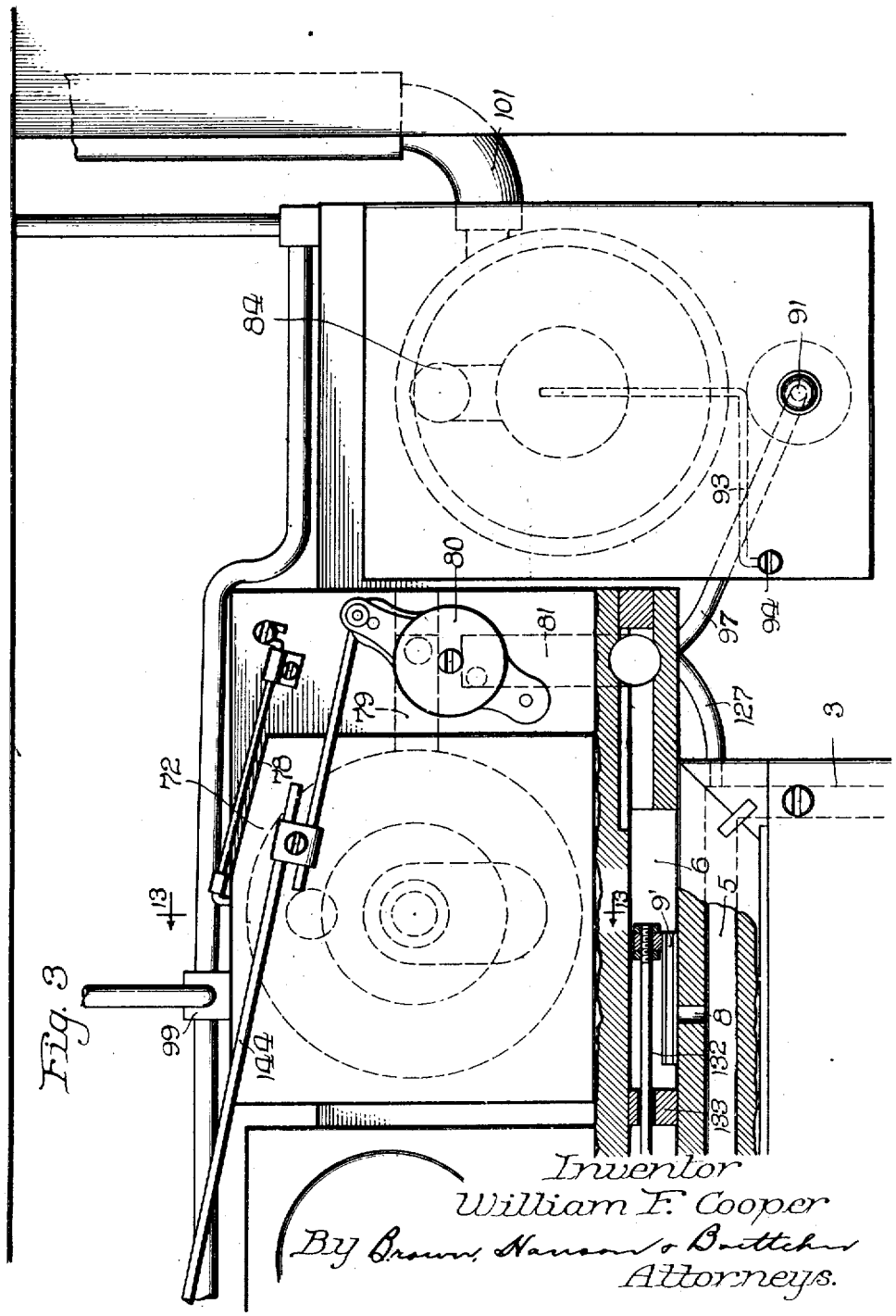

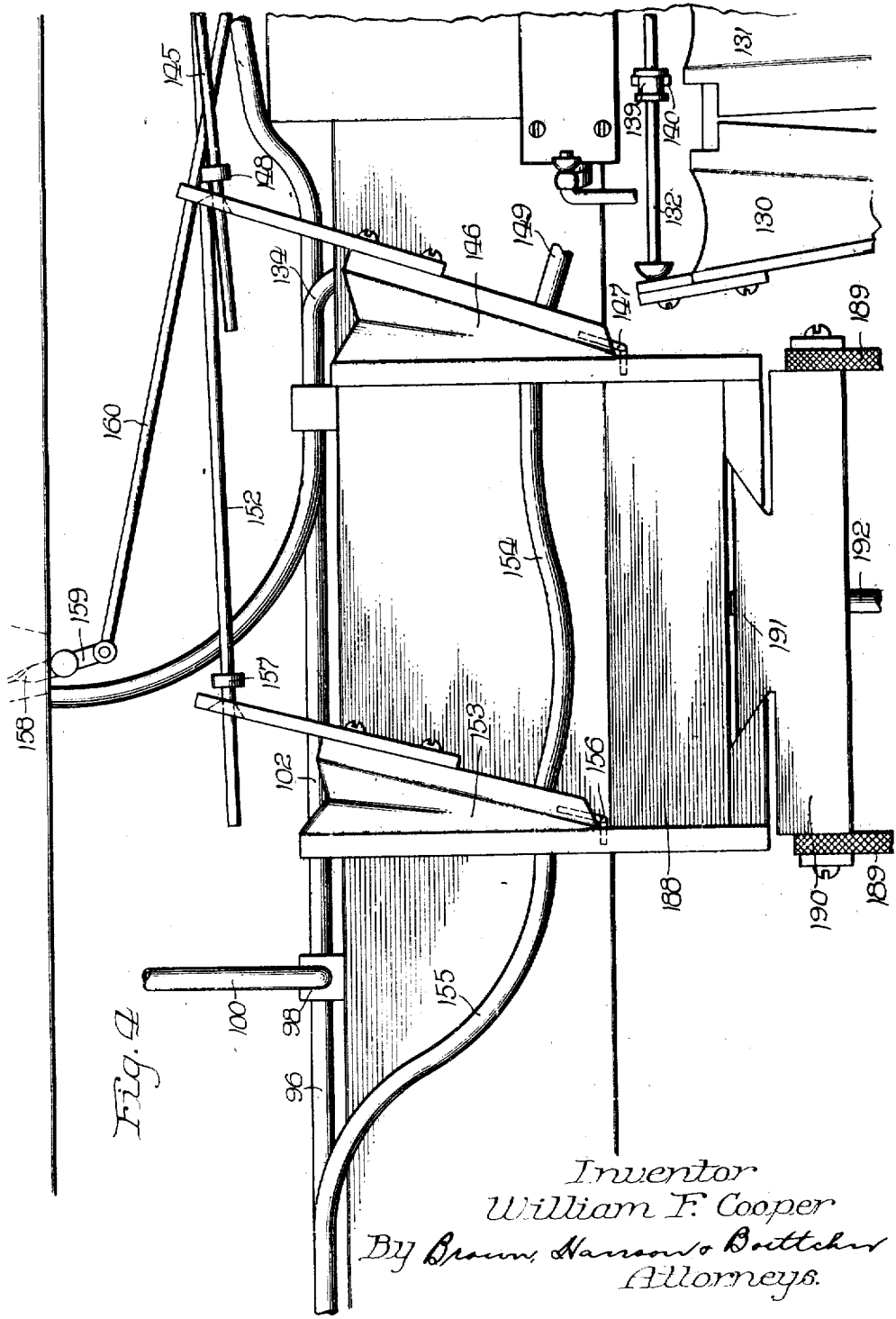

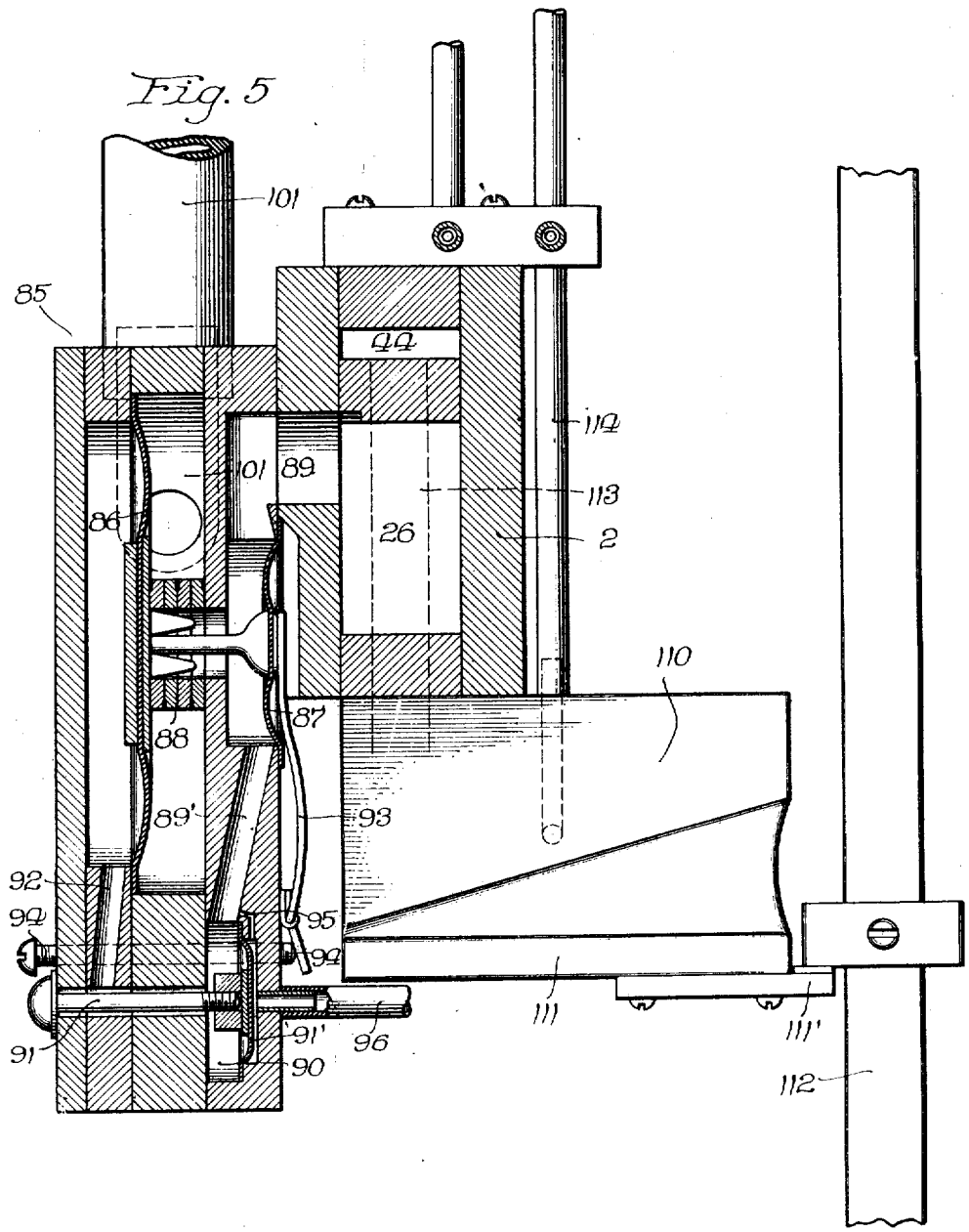

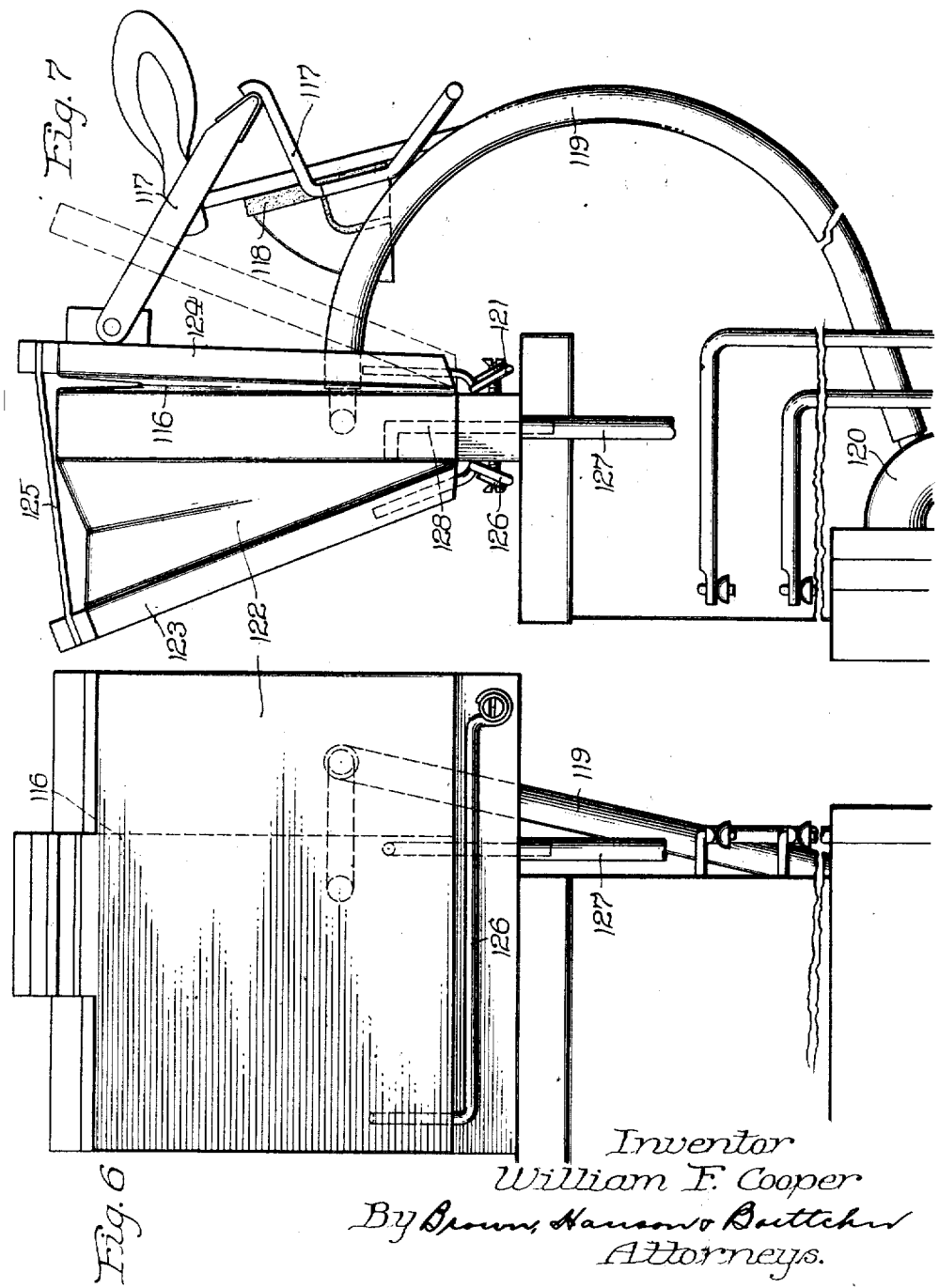

Dec. 19, 1922.
W. F. COOPER.
PLAYER PIANO.
FILED OCT. 5, 1917.
1,439,148
12 SHEETS-SHEET 7
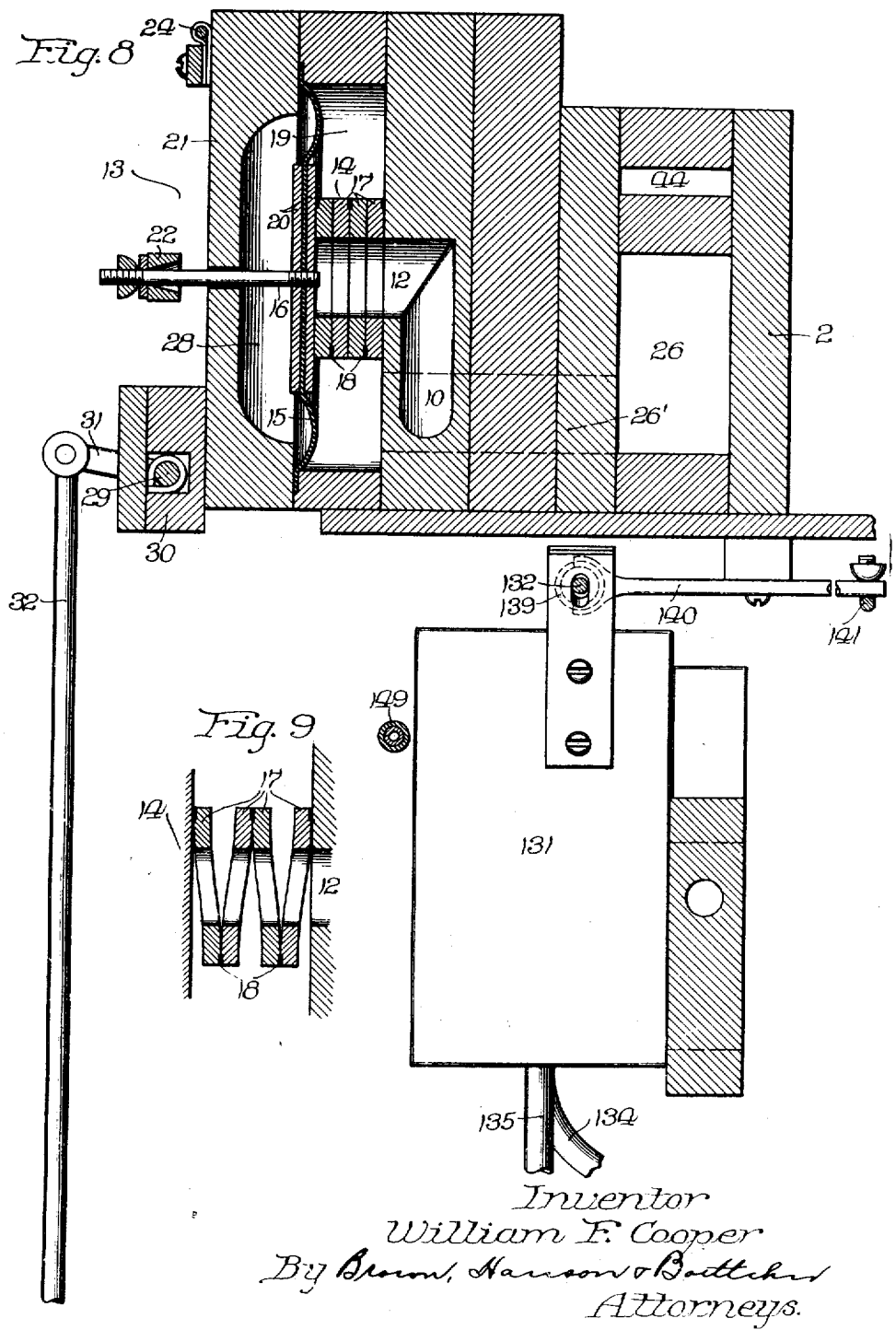

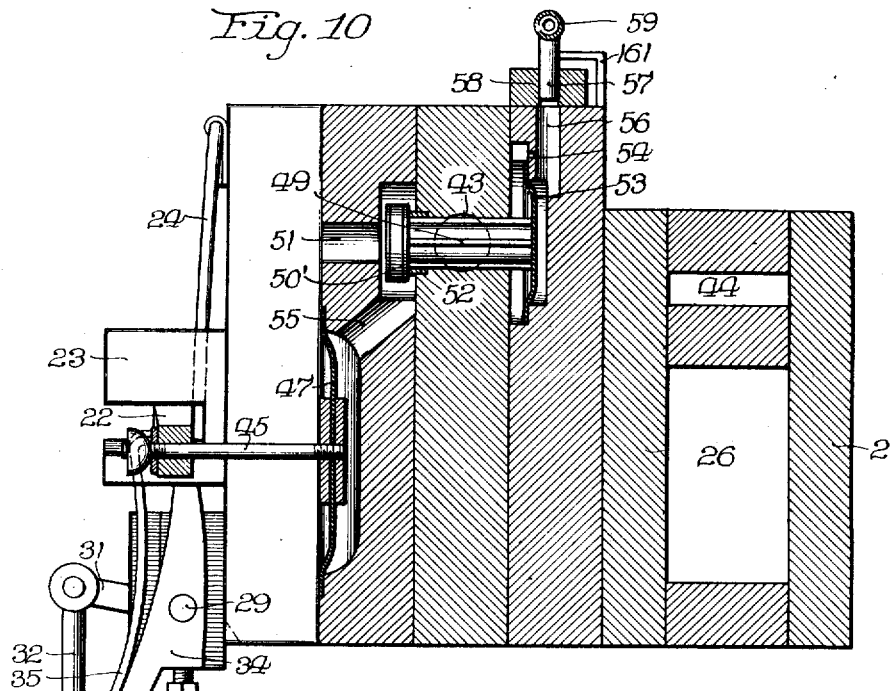
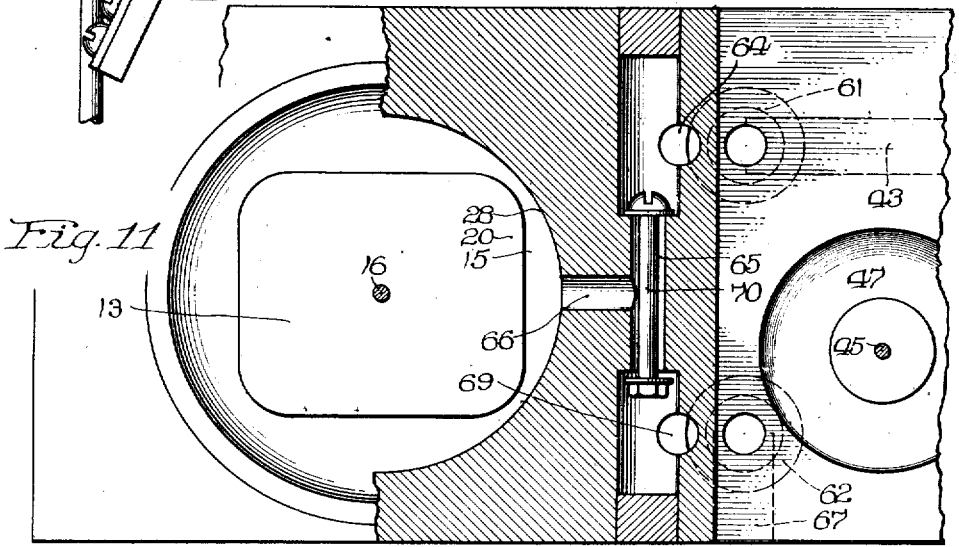

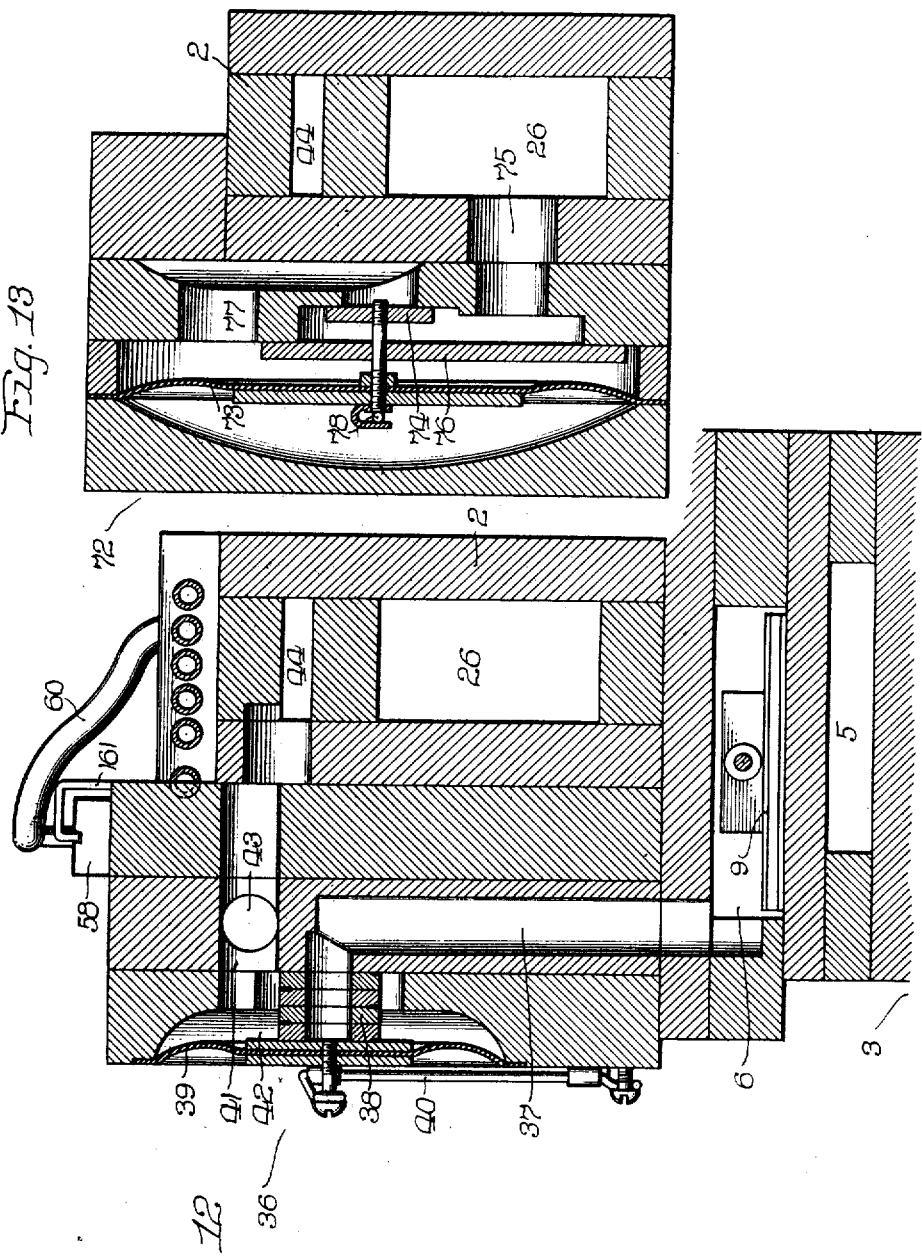

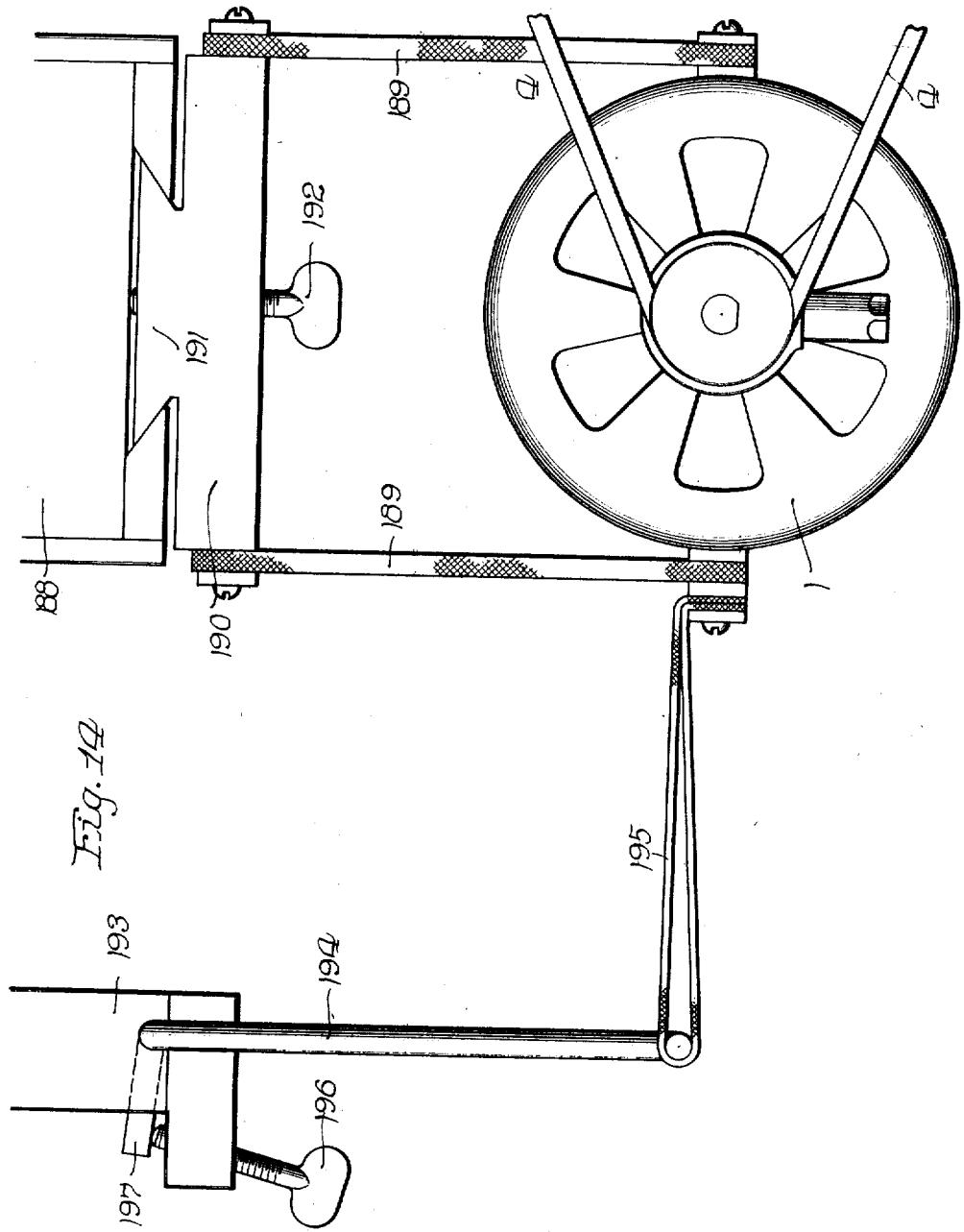

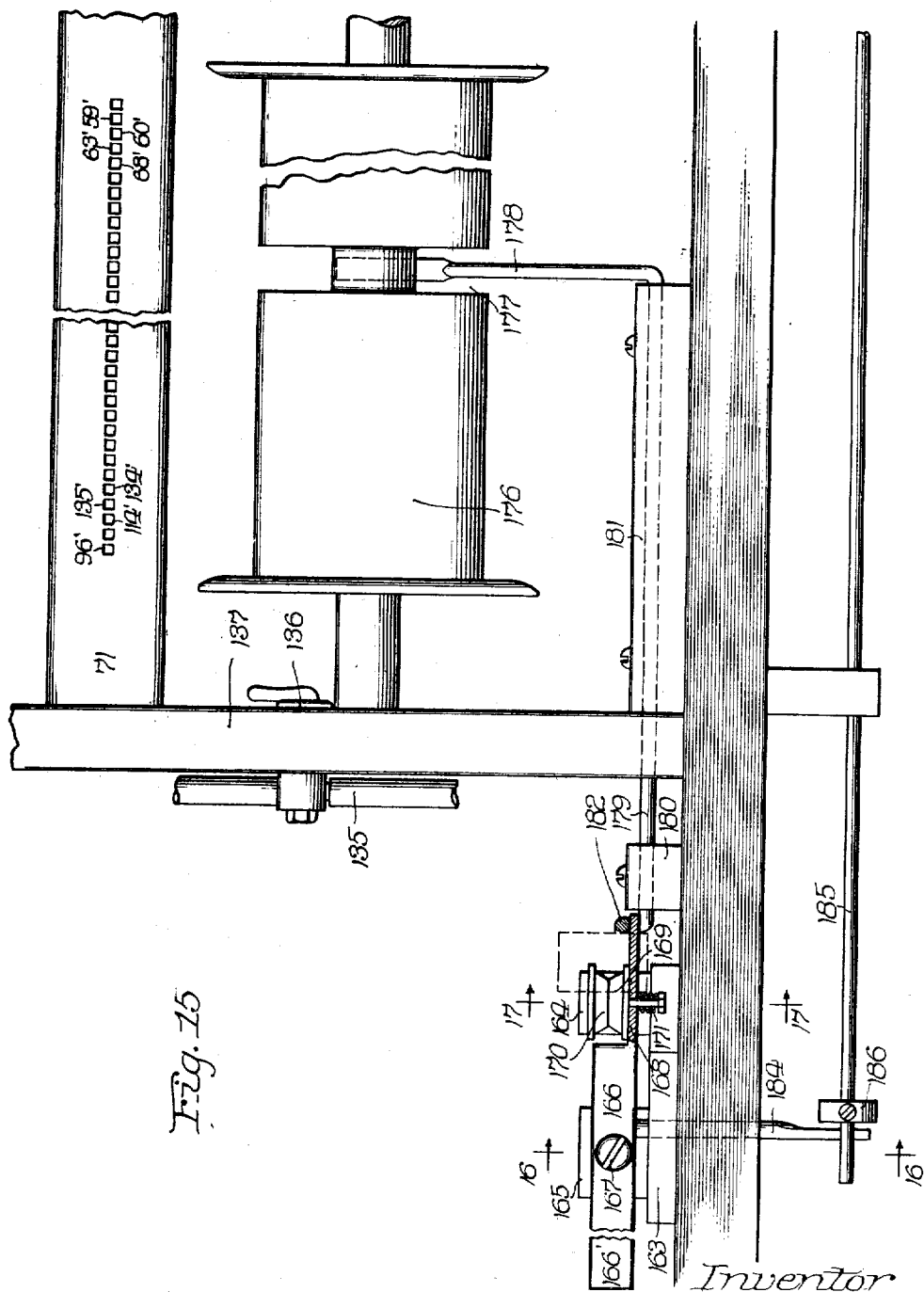

Dec. 19, 1922.

W. F. COOPER.
PLAYER PIANO.
FILED OCT. 5, 1917.

Inventor
William F. Cooper
By Brown, Hanson & Boettcher
Attorneys

Patented Dec. 19, 1922.

1,439,148

UNITED STATES PATENT OFFICE.

WILLIAM F. COOPER, OF CHICAGO, ILLINOIS.

PLAYER PIANO.

Application filed October 5, 1917. Serial No. 194,860.

*To all whom it may concern:*

Be it known that I, WILLIAM F. COOPER, a citizen of the United States, residing at Chicago, in the county of Cook and State of Illinois, have invented a certain new and useful Improvement in Player Pianos, of which the following is a full, clear, concise, and exact description, reference being had to the accompanying drawings, forming a part of this specification.

My invention relates to pneumatic player pianos, and more particularly to electrically driven player pianos.

It has for its primary object the improvement of the expression mechanism for securing fine gradations of the suction pressure at the pneumatic action, and these over a wide range of pressures. The expression mechanism comprises a pressure regulator interposed between the pump and the action, which is influenced pneumatically from the tracker bar or which may be controlled by the operator from a pedal or some manual control mechanism. The particular valve construction employed in the regulator and the manner of influencing this valve from the tracker bar control are the principal features tending toward the improvement of the expression mechanism. A secondary object of my invention is to provide an improved hammer rail control, which automatically assumes an active position the instant the player is operated pneumatically and which automatically retracts to an inactive position when the player ceases operating pneumatically.

Another object of my invention is to make the controls of a piano automatic in their action by returning them to their normal positions when the operation of the pneumatic player ceases so that a minimum number of operations are necessary to start and stop the player.

Another object of my invention is to suspend the electric motor by fabric suspension members to insulate the piano from the vibration of the electric motor.

Another object of my invention is to provide an improved electric switch for controlling the circuit of the electric motor which is controlled automatically by the position of the music sheet in the tracker box and also by the position of the tempo indicator.

Numerous other novel features will appear in the following detailed specification, taken in connection with the accompanying drawings, in which—

Figure 2 is an elevational view of the expression apparatus;

Figure 3 is an elevational view of the air motor regulator and tempo valve and also the treble pressure regulator;

Figure 4 is an elevational view of the automatic reroll and tempo return pneumatics;

Figure 5 is a sectional view taken on the line 5—5 of Figure 1, showing the bass pressure regulator and the sustain pneumatic;

Figure 6 is an elevational view of the front of the hammer rail control pneumatic;

Figure 7 is a side elevation of the same;

Figure 8 is a sectional view of the main pressure regulator taken on the line 8—8 of Figure 2;

Figure 9 is an isolated sectional view of the multiple valve of the regulator, in open position;

Figure 10 is a sectional view taken on the line 10—10 of Figure 2;

Figure 11 is a fragmentary sectional view through the cover of the main pressure regulator;

Figure 12 is a sectional view taken on the line 12—12 of Figure 2;

Figure 13 is a sectional view taken on the line 13—13 of Figure 3;

Figure 14 is an elevational view of the electric motor suspension;

Figure 15 is a fragmentary elevational view of the tracker box and the electric switch adjacent thereto;

Figure 1:
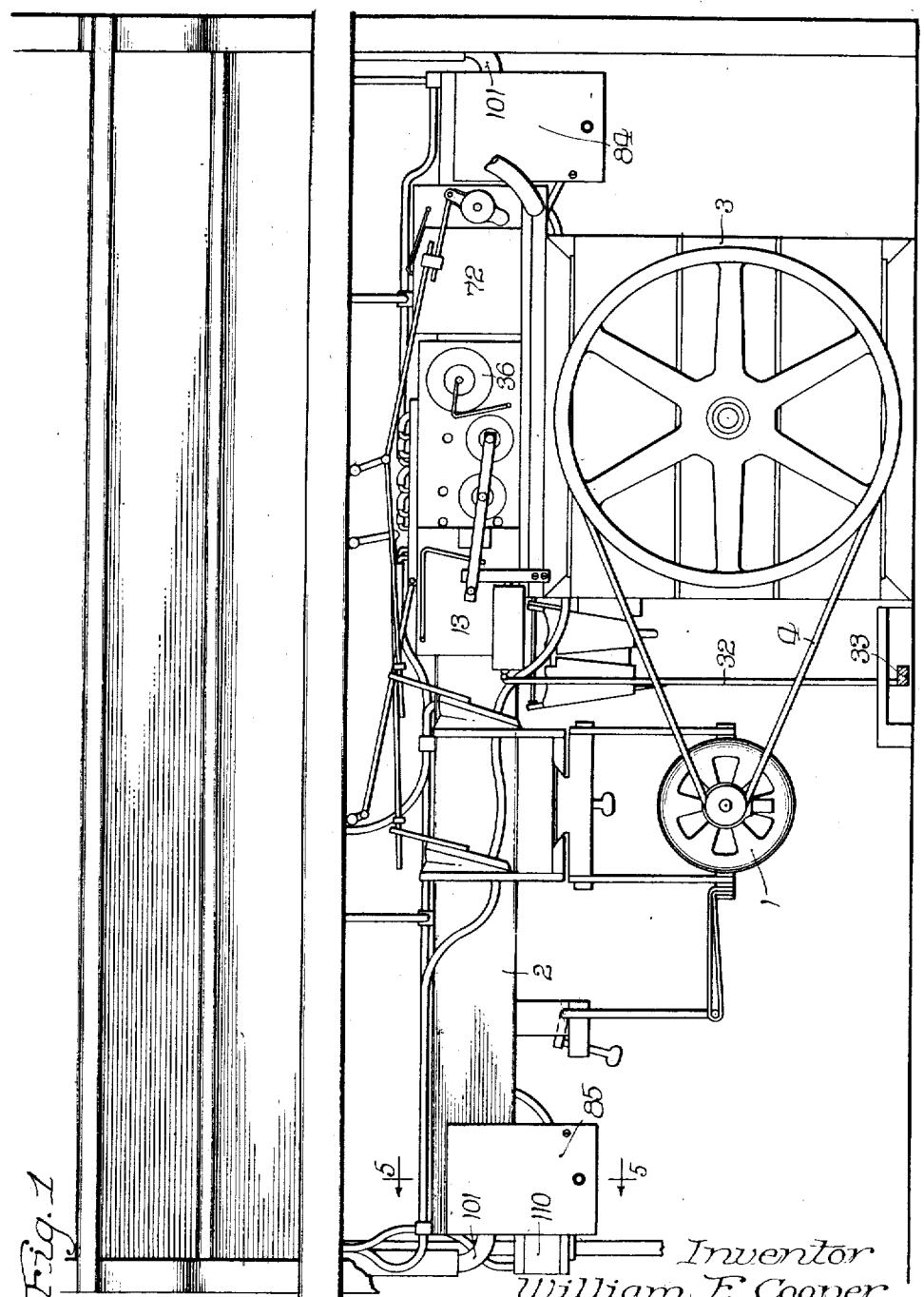
Figure 1 is a fragmentary front view of the piano of my invention with the lower part of the casing removed to show the general arrangement and locations of the various mechanisms.

An electric motor 1 suspended from the channel section 2 drives the pneumatic pump 3 through the medium of two V-belts 4—4, disposed one behind the other and therefore not shown in Figure 1. The pump 3 is of the ordinary type employing a plurality of feeders disposed about a crank to which they are connected by fabric connectors.

Referring to Figure 2, a channel 5 extends completely around on all sides of the pump 3 and serves as a common inlet to all of the feeders. Another channel 6 in the top of the pump frame communicates with the channel 5 through the ports 7 and 8 which are covered and uncovered by valves 9 and 9' respectively, the former valve controlling the passage of air from the pneumatic action to the pump and the latter valve effecting a by-pass around the air motor regulator upon re-rolling the music sheet. The manner of operation of these valves will be hereinafter set forth in connection with the description of the re-roll mechanism. Leading diagonally upward in the left-hand end of the channel 6 (Figures 2 and 8) is the passageway 10 which communicates with the valve passage 12 of the main pressure regulator 13.

The main pressure regulator is illustrated in detail in Figure 8 and comprises a multiple valve 14, a diaphragm 15, and a diaphragm stem 16. The multiple valve 14 consists of a series of leather pieces 17 having a central opening therethrough, which are superposed one upon the other and have their alternate edges or corners glued together, as indicated at 18. The two end leathers are glued at their corners to the face of the diaphragm 15 and to the wall of the diaphragm chamber 19, respectively, so that upon flexing of the diaphragm 15 outward the valve as a whole will be distended as shown in Figure 9, and the series of leathers 17 will be separated at their free edges, affording a plurality of valve openings, wherefrom I get the term "multiple" value. The leather pieces 17 may be round, square or of any shape and of any number to take care of the volume and pressure changes to be handled by the regulator. They may be glued at alternate portions of their perimeters in two or more planes. I find this construction of value particularly effective in that it is not subject to vibration or "chattering" when exceedingly high and low pressures are passed through the regulator, this vibration being eliminated mainly through the admission of air over a large area extended between the several layers of leather. This valve is, I find, frictionless in operation and opens instantly to admit a large volume of air at a low pressure. Quite obviously the valve may be made of other materials and in other forms, as by slitting in opposite directions a solid tube of rubber. I lay particular stress upon this construction of valve as a valuable improvement upon devices of this character. Two discs 20—20 are secured upon opposite sides of the diaphragm 15 and threaded into the discs is the diaphragm stem 16. The stem 16 extends out through the cover 21 of the regulator and engages with the end of a lever 22, pivoted for oscillation in a slotted opening in the block 23 on a pin 23' extending through the block, as shown in Figures 2 and 10. A torsion spring 24 adjustable by means of the screw 25, adjacent the upper edge of the regulator cover 21 (Figure 8), has its torsion arm engaging against the under face of the lever 22 between its fulcrum in the block 23 and its connection with the diaphragm stem 16. The tension of this torsion spring 24 is transmitted through the lever 22 and the diaphragm stem 16 to the diaphragm 15 and the spring is so adjusted that it will normally retain the multiple valve open ever so slightly, this minimum opening delivering the lowest suction pressure effective at the pneumatic action. To avoid any chance of misunderstanding, I wish it understood that the term high suction pressure be considered as synonymous to high vacuum and low suction pressure as synonymous to low vacuum. Extending back from the diaphragm chamber 19 is the passageways 26', which communicates with the main channel 26, passing from extreme treble end to extreme bass end of the channel section 2.

In the under face of the regulator cover 21 is the chamber 28 which can be exhausted by suction pressures of different intensities. The admission of suction pressure to the chamber 28 is controlled by pouch and valve units, which are operated from the tracker bar, all of which will be hereinafter described.

A shaft 29 pivotally mounted in the pedestal block 30, on the lower edge of the regulator cover 21, has the arm 31 thereof pivotally connected to the vertical rod 32, which in turn is connected to the expression pedal 33 for manual operation of the expression mechanism. The opposite end of the shaft 29 has mounted thereon a rocking lever 34, to one end of which is secured the curved leaf spring 35. The opposite end of the leaf spring 35 is bent downward to engage under the lever 22, as illustrated in Figures 2 and 10. The curvatures of the leaf spring 35 and the face of the lever 34 afford a rolling contact therebetween which applies a gradually increasing spring tension to the regulator diaphragm 15 upon depressing the expression pedal 33. After the leaf spring 35 has come into contact with the entire surface of the lever 34 continued rotation of the lever will result in a direct mechanical lift of the regulator diaphragm.

Referring to Figure 2, a subsidiary pressure regulator 36 communicates with the high suction pressure channel 6 by way of the vertical passageway 37. The subsidiary pressure regulator 36 is constructed similarly to the main pressure regulator 13, comprising a multiple valve 38, the central opening of which is in communication with the passageway 37, and a diaphragm 39, as shown in Figure 12. The outer face of the diaphragm 39 is subjected to atmospheric pressure, a torsion spring 40 maintaining a slight tension upon the diaphragm 39 to keep the multiple valve 38 slightly distended, this valve being preferably adjusted to secure a suction pressure drop of approximately one-half; that is, to say, the suction pressure in the diaphragm chamber 42 is approximately one-half the suction pressure in the passageway 37. A passageway 41 leads from the diaphragm chamber 42 and communicates with the passageway 43, extending longitudinally of the expression mechanism and also with the low pressure channel 44 situated above the high pressure channel 26 in the channel section 2.

As shown in Figure 2, the lever 22 extends some distance to the right of the block 23 and has connection, through diaphragm stems 45 and 46 with diaphragms 47 and 48. Controlling each diaphragm is a pouch and valve unit 49 and 50. The diaphragm 47 and its cooperating pouch and valve 49 are illustrated in detail in Figure 10. The valve 49 lies in a valve way which is in communication with the longitudinal passageway 43. To one end of the valve body 49 is secured the valve head 50', which has leather facings thereon adapted to abut and close off either the atmosphere inlet 51 or the metal ferrule 52. The pouch diaphragm 53 is normally in a balanced condition, the half-pressure suction acting equally upon both sides of the diaphragm through the bleeder opening 54. Accordingly the suction under the head 50' on the valve retains the valve against the metal ferrule 52, allowing the atmospheric pressure to pass in through the opening 51 and diagonal passageway 55 under the diaphragm 47. The outer face of the pouch diaphragm 53 communicates through the passageway 56 with the elbow 57 mounted in the slide valve 58, this elbow being connected to lead 59 extending up to a perforation 59' in the tracker bar 71 (Figure 15). Upon uncovering this perforation in the tracker bar atmospheric pressure will be impressed upon the outer face of the pouch diaphragm 53, throwing the valve 49 to the left and admitting suction pressure under the diaphragm 47. This half-pressure sucks inwardly upon the diaphragm 47 and oscillates the lever 22 slightly, thereby opening the regulator valve and increasing the suction pressure at the pneumatic action proportionally. The diaphragm 48 has a more effective lever arm and its operation results in a greater opening of the regulator valve and a proportionally higher suction pressure at the pneumatic action. A lead 60 extending to a perforation 60' in the tracker bar controls the pouch and valve unit 50 of the diaphragm 48, which is identical to that just described. Two other pouch and valve units 61 and 62 are provided for controlling the admission of suction pressure to the chamber 28 of the main pressure regulator, as more clearly shown in Figure 11. The valve 61 has communication with the longitudinal passageway 43 and is controlled by the lead 63 extending to a perforation 63' in the tracker bar 71. In this case the half-pressure suction is transmitted from the valve well through the hole 64 and passages 65 and 66 to the upper surface of the diaphragm 15. The pouch and valve unit 62 transmits the high-pressure suction directly from the channel 6 through the passageway 67 (shown in dotted lines in Figure 2). Upon actuating of the pouch and valve 62, controlled through the lead 68, extending to the tracker bar perforation 68', the high pressure suction is transmitted through the hole 69 in communication with the valve well, and the passages 65 and 66 to the chamber 28 of the main pressure regulator. A valve member 70 is suspended in the passageway 65 to prevent a "blowing through" of the suction pressure upon the operation of either valve, otherwise the suction pressure would pass down into the valve well and out through the atmospheric inlet of the non-operating valve. Normally the diaphragm 15 of the main pressure regulator is subjected to atmospheric pressure admitted through the atmospheric inlet of the valve 62, through the hole 69, past the valve 70 and through the passageways 65 and 66 to the chamber 28. Upon the operation of either the half-pressure valve 61 or the high pressure valve 62 the suction pressure acts instantaneously upon the outer side of the regulator diaphragm 15, permitting the torsion spring 24 to open wide the multiple valve 14, admitting a high suction pressure to the channel 26 and the pneumatic action. The subsidiary pressure regulator 36 is adjusted so that its lower suction pressure, acting through the diaphragms 47 and 48 and the valve 61 will secure correct and positive variations in the suction pressure at the player action. The two controls acting upon the pressure regulator through the lever 22 and the two sub-atmosphere controls acting upon the regulator diaphragm 15, in addition to the torsion spring 24, constitute five controls which may be taken individually or in varied combinations to obtain a multiplicity of pressure graduations by the main pressure regulator 13.

Referring to Figures 3 and 13, a motor pressure regulator 72, comprising a diaphragm 73 and a valve 74, communicates with the channel 26 by way of the passage 75. A partition 76 separates the diaphragm chamber from the valve chamber, and a passageway 77 connects the under face of the valve 74 with the under face of the diaphragm 73. A torsion spring 78, see Figure 3, normally keeps the valve 74 unseated. The suction pressure is transmitted from the diaphragm chamber through the passageway 79, tempo valve 80, passageway 81, and a suitable flexible conduit to the air motor adjacent the tracker bar. The suction from the channel 26 tends to unseat the valve 74 and the suction pressure under the diaphragm 73 opposes this, tending to seat the valve 74. By properly proportioning the two differential areas the regulator can be made to smooth out the undulating pressures from the channel 26. It is desirable that a certain proportion of the pressure increases be transmitted to the air motor, inasmuch as an increase in suction pressure at the pneumatic action means a greater retarding influence upon the music sheet and requires a correspondingly greater amount of power from the air motor. At the treble and bass ends of the channel section 2 are mounted the treble and bass pressure regulators 84 and 85, respectively. The regulators are supported upon the outer face of the channel section 2, as illustrated in Figure 5, and consist of a large diaphragm 86 and a small diaphragm 87 arranged in opposition with a multiple valve 88 under their influence for effecting the pressure regulation. A passageway 89 serves to connect the channel 26 with the inner face of the diaphragm 87 and with the central opening in the multiple valve 88. Leading downward from adjacent the inner face of the diaphragm 87 is the passage 89', which opens into the pouch chamber 90. This pouch and valve construction is of the conventional type, the valve 91 normally admitting suction pressure up along the stem thereof and through the passageway 92 on to the upper surface of the large diaphragm 86. A torsion spring 93, adjustable by means of the screw 94, normally tends to hold the multiple valve distended. Normally no suction pressure drop occurs in the regulator, inasmuch as the large diaphragm 86 is neutralized by having equal suction pressures on both sides thereof and smaller diaphragm 87 in conjunction with the torsion spring 93, tending to keep the multiple valve 88 at a maximum opening. The pouch diaphragm 91' is neutralized through the bleeder opening 95, and a lead 96, in communication with the outer face of the pouch diaphragm 91', extends up to a perforation 96' in the tracker bar. Upon uncovering this perforation the pouch diaphragm and the valve 91 are thrown to the left, shutting off the suction pressure to the upper face of the diaphragm 86 and admitting atmospheric pressure down around the outer end of the valve stem 91 and onto the outer face of the large diaphragm 86. Atmospheric pressure being impressed upon the outer face of the valve 86 and upon the outer face of the valve 87, the differential areas of the inner faces of these diaphragms coact to limit the opening of the multiple valve 88 and secure a drop of pressure through the regulator. I find it desirable to so proportion the areas of the two diaphragms, that a suction pressure drop of from one-half to one-third will occur upon the operation of the regulator. The treble pressure regulator is identical with the foregoing and will not be described. The elbows 101—101 shown in Figures 1 and 3 connect the treble and bass pressure regulators with the stacks of pneumatics at the player action. The leads 96 and 97 for the bass and treble regulators respectively, are passed along the top of the channel section 2 and make connection with T-blocks 98 and 99 respectively, as shown in Figures 3 and 4. Considering only the bass regulator as exemplary of the two, a lead 100 extends upwardly to a manually controlled button in the key bed, wherefrom the regulator can be operated manually. Another lead 102 extends from the T-block 98 to an elbow 103, mounted in the slide valve 58. Communication is had between this latter elbow and a companion elbow 104 by way of a recess 105 under the slide valve 58, a lead 106 extending from the latter elbow 104 to a perforation 96' in the tracker bar.

The sustain is arranged for the ordinary pedal operation and in addition has a pneumatic operably connected thereto, which is controlled automatically from a perforation in the tracker bar and manually from a push button valve in the key bed. This pneumatic, which is designated 110, is suspended below the channel section 2 at the extreme bass end thereof, as shown in Figures 1 and 5. The movable leaf 111 has an extension 111' secured to it, which engages an adjustable stop on the trap rod 112 to lift the latter whenever the pneumatic is collapsed. I find that the employment of the relatively high suction pressure for the operation of the sustain to be very objectionable, due to popping and hissing noises emanating from the tracker bar upon frequent or lengthy periods of sustain, particularly so during soft passages of the music. I therefore have arranged to employ the subsidiary or half-pressure suction as reduced by the subsidiary pressure regulator 36 for this control. As previously explained, the diaphragm chamber 42, which corresponds to the low pressure side of the subsidiary regulator 36, communicates by way of the passageway 41 with the half-pressure channel 44, in the upper part of the channel section 2. This subsidiary or half-pressure channel 44 extends to the extreme bass end of the channel section, where it connects with the sustain pneumatic through the vertical passageway 113, shown in dotted lines in Figure 5. A suitable pouch and valve (not shown) are mounted in the body of the pneumatic 110 and are controlled through the lead 114, manually from a button valve in the key bed and automatically from the tracker board perforation 114' as were the treble and bass pressure regulators. This pouch and valve in turn control the admission of the half-pressure suction to the pneumatic 110.

The hammer rail is arranged for ordinary pedal operation and is also controlled pneumatically by the suction pressure at the pneumatic action so as to obtain a long hammer stroke at the higher suction pressures, and a short hammer stroke at the lower suction pressures, to augment the changes in volume of tone.

Referring to Figures 6 and 7, a pneumatic 116 is connected through the linkages 117 to the hammer rail 118, this pneumatic being connected through the flexible lead 119 to the elbow 120 leading to the action channel. A torsion spring 121 normally tends to hold this pneumatic distended with the hammer rail close to the strings but this is opposed by the suction pressure in the action channel which tends to collapse the pneumatic 116 to a greater or less degree, according to its pressure. Upon the back side of the pneumatic 116 is mounted the return pneumatic 122, which has its movable leaf 123 connected to the opposing movable leaf 124 of the pneumatic 116 by the fabric connector strap 125. The return pneumatic 122 is provided with a powerful torsion spring 126, amply strong enough to overcome the weaker torsion spring 121 of the pneumatic 116, this stronger torsion spring 126 normally retaining the pneumatic 116 and the hammer rail 118 in a retracted position when the piano is not operating pneumatically. The dotted line in Figure 6 indicates the edge of the pneumatic 116 and it will be seen that the pneumatic 122 is considerably larger. A lead 127 communicating with the high suction pressure channel 5 of the pump 3 has communication with the interior of the pneumatic 122 through the bore 128. Upon starting the pneumatic player this high suction pressure collapses the pneumatic 122, thus liberating the pneumatic 116 from the tension of the fabric strap 125, permitting the pneumatic 116 to change the position of the hammer rail 118 in correspondence to the suction pressure at the pneumatic action. By properly adjusting the tension of the torsion spring 121 relative to the suction pressure at the pneumatic action, remarkably quick and artistic results can be secured. Upon cessation of the pneumatic player operation the pneumatic 122 is relieved of the high suction pressure from the pump 3 and instantaneously retracts the pneumatic 116 and hammer rail 118 to the position illustrated, thus allowing manual operation of piano keys. I have divided the hammer rail 118 into two sections controllable by pairs of opposing pneumatics situated at each end of the piano, though the hammer rail may be divided into a greater number of sections with a corresponding number of pairs of operating pneumatics.

A reroll pneumatic 130 and a repeat pneumatic 131 are supported upon the left hand edge of the pump frame 3, as shown in Figures 2, 4, and 8. These pneumatics are adapted for reciprocation of the valve rod 132, sliding in the channel 6 of the pump 3, and being secured to the valves 9 and 9', previously referred to. A partition 133 divides this channel 6 into two valve chambers. The valve chamber to the right of the partition 133 extends over to the right and communicates with the conduit 81, which connects the tempo valve 80 and the air motor. The pneumatics 130 and 131 are connected with controlling perforations 134' and 135' in the tracker bar by way of leads 134 and 135. When the music sheet has been entirely played the reroll perforation in the tracker bar is uncovered, the reroll pneumatic 130 is collapsed, and the movable leaf thereof strikes the end of the valve rod 132, shifting the valve rod 132, covering the port 7 and uncovering the port 8. This action shuts off the pump 3 from the pneumatic action and shunts the high pressure suction around the motor governor 72 directly to the air motor at the tracker bar, so that it will run at high speed and reroll the music sheet rapidly. When the music sheet is nearly all rerolled the repeat perforation in the tracker bar is uncovered the repeat pneumatic 131 is collapsed, and a reversal of the valves 9 and 9' is effected, supplying suction pressure to the pneumatic action and a governed suction pressure to the air motor for replaying the sheet. A stop valve 136, mounted in the tracker box 137 is interposed in the lead 135 between the repeat perforation in the tracker bar and the repeat pneumatic to enable the operator to throw into or out of action at will, the repeat control. Upon the operation of the repeat pneumatic 131, the movable leaf thereof, strikes the spool 139, pinned to the valve rod 132, this spool 139 in addition to shifting the valve rod oscillates the lever 140 (Figure 8) and imparts a thrusting movement to the rod 141, which extends up to the air motor and controls the transmission gearing thereof, in a manner which will be apparent to those skilled in the art. The tempo control of the player is effected through the operation of the tempo lever 142, mounted in the key bed of the piano, the motion of this lever being transmitted to the arm 143, rod 144, to the tempo valve 80, see Figures 1, 2 and 3. Another rod 145 extends to the left of the arm 143, the end of this rod being supported in the movable leaf of a return pneumatic 146. When the player is not operating the torsion spring 147 retains the movable leaf of the pneumatic 146 in the position illustrated, the movable leaf thereof having engaged with the stop 148 on the rod 145 and returned the tempo control to "Stop" position. A flexible tube 149 connects the interior of the pneumatic 146 with the high pressure channel 5 of the pump, and it will be apparent that upon starting the player the pneumatic 146 will be collapsed, permitting the tempo control to be adjusted to any speed. An arm 151 having pivoted thereto an actuating rod 152, is connected to the reroll lever 150. The rod 152 is similarly supported in the movable leaf of a return pneumatic 153. The interior of this latter pneumatic is in series with the pneumatic 146, by way of the tube 154 and is arranged to be collapsed by the high pressure suction from the pump 3. A tube 155 connected to the back of the pneumatic 153 conveys this high pressure suction to the hammer rail return pneumatic 122 at the bass end of the piano. The pneumatic 153 has a torsion spring 156 which normally tends to bring the movable leaf of the pneumatic into engagement with the stop 157 on the rod 152.

When the operation of the player is started, the return pneumatics 146 and 153 collapse to inoperative positions, permitting free movement of the tempo and reroll levers in either direction. After rerolling the music sheet and stopping the electric motor 2, the return pneumatics 146 and 153 return the tempo and reroll levers to their normal or off positions. These pneumatics by resetting the transmission gearing to playing position and returning the tempo valve to "Stop" position, minimize the number of operations necessary, preparatory to playing a piece of music.

Another arm 159 is arranged to be actuated from a lever 158 in the key-bed when it is desired to play the piano pneumatically but control the expression mechanism and the treble and bass regulators 84 and 85 manually. This arm is illustrated in Figure 4 and has pivotal connection with a rod 160, which is pivotally connected to the slide valve 58, which is guided for sliding motion upon the top of the expression mechanism by guide pieces 161, 161. Motion of the slide valve 58 to the left (Figure 2), severs the connections between the expression mechanism, treble and bass pressure regulators, and their respective perforations in the tracker bar, as will be clearly understood from the drawings.

The switch controlling the circuit of the electric motor 1 is closed automatically when a music sheet is connected to the take-up roll preparatory to playing and is opened automatically when the sheet has been completely rewound. Moreover, the position of the electric switch is arranged to be dependent upon the position of the tempo mechanism, so that the electric motor 1 and the air motor driving the rolls will always run practically simultaneously.

Figure 16:
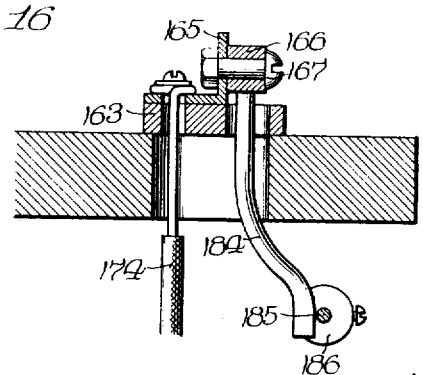
Figure 16 is a sectional view taken on the line 16—16 of Figure 15.
Figure 17:
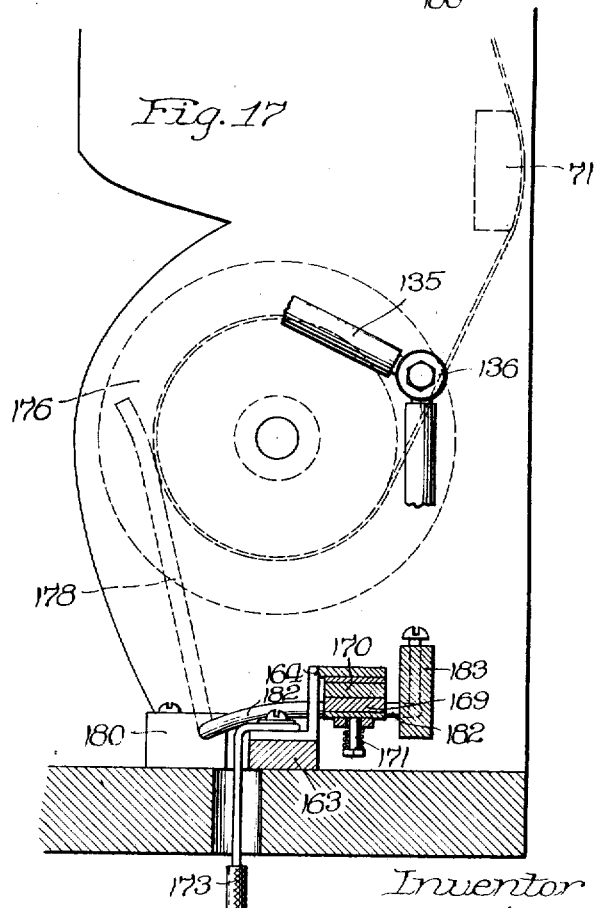
Figure 17 is a sectional view taken on the line 17—17 of Figure 15.

Referring to Figures 14, 15 and 16, a switch base 163, mounted adjacent the tracker box bears the angle sections 164 and 165 which support the fixed and movable contacts, respectively. An arm 166 is pivoted at 167 upon the angle section 164, and this arm supports on its lip 168 a carbon contact member 169, which normally tends to contact with the fixed carbon member 170 under the influence of the preponderating weight of the arm 166' to the left of the pivot 167. A spring connection 171 is employed between the lip 168 and the contact member 169 so that the contact member may tilt with respect to the lip 168 and thereby adjust itself to secure the greatest area of engagement between the two contacts. Conductors 173 and 174, in series in the motor circuit, are connected to the angle sections 164 and 165, respectively.

The take-up roll 176 is formed with an annular groove 177 near the end thereof, as shown in Figure 15. In this groove plays the upright arm 178 of the bell crank rod 179, the horizontal portion of which extends through the side of the tracker box into proximity to the electric switch, and has pivotal bearings in the blocks 180 and 181. The other arm 182 of the bell crank rod is extended up over the lip 168, of the switch arm 166, a weight 183 secured to the end of the bell crank arm 182, normally holding the contacts separated and the upright arm 178 in the groove 177 in the take-up roll 176. Upon applying a turn of music sheet to the take-up roll 176, the upright arm 178 is thrust out of the groove in the take-up roll, thereby oscillating the horizontal arm 182 out of engagement with the lip 168, permitting the movable and fixed contacts to engage and start the electric motor 1. In re-winding, the instant the extremity of the music sheet passes from beneath the upright arm 178 the same moves into the groove 177, permitting the horizontal arm 182 to depress the lip 168 and separate the contacts.

A finger 184 is secured to the under side of the movable arm 166 and extends down through a hole in the switch base and into juxtaposition to the horizontal rod 185. The rod 185 is arranged to be reciprocated by any suitable lever or crank upon actuation of the tempo control and has adjustably mounted thereon a stop collar 186 adapted to engage the finger 184 and rotate the movable arm 166, separating the contacts when the rod 185 is thrust to the extreme left position, as viewed in Figure 15. This extreme left position corresponds to the "Stop" position of the tempo indicator, which in turn corresponds to the inert condition of the air motor for driving the music rolls. This latter control between the tempo rod 185 and the switch finger 184 is to prevent the closure of the electric switch when the tempo valve is open, otherwise the air motor and take-up roll would begin revolving immediately after the music sheet were applied to the take-up roll and possibly before the sheet could be firmly connected to the roll. Furthermore, this control prevents stopping of the air motor without concurrently stopping the electric motor, which might otherwise result in futile running of the pump 3 with the music sheet motionless upon the tracker board, which would impose an injurious strain upon the pump feeders.

I have provided a unique and efficacious method of supporting the electric motor 1 in the piano casing, which renders the electric motor absolutely soundless and positively insulates the piano casing from all vibration from the motor. It is desirable that the electric motor be readily interchangeable, so that if the motor provided in the player be unsuitable for the characteristic or voltage of the current available to the purchaser, a motor having the proper winding therefor can be interchanged.

As illustrated in Figures 1 and 14, I suspend from the channel section 2 a block 188 having a dove-tail groove therein. The motor 1 is swung between two wide fabric straps 189, 189 which are secured at their upper edges to the block 190, this latter block having a dove-tail member 191 thereon, to engage in the correspondingly shaped groove in the rigid block 188. A thumb screw 192, threaded in the block 190, and pressing against the block 188, securely binds the dove-tail union of the two blocks together. Also suspended from the channel section 2 is the bracket member 193 having pivotally suspended therein the arm 194, which maintains a spring tension on the belts 4—4, through the medium of the fabric loop 195 between it and the motor 1. This spring tension is adjustably imparted to the arm 194 through the agency of the thumb screw 196, in engagement with the lateral extension 197 of the arm 194. The natural resiliency of the long arm 194 and its ability to flex somewhat maintain the belts 4—4 at a proper driving tension, irrespective of the influence of humidity or temperature upon the leather of the belts. The fabric straps 189 permit the motor 1 to swing freely in the plane of the belts 4—4. Quite obviously, the cloth fabric pieces, 189, and 195, afford an effective vibratory insulation between the motor 1 and the main body of the piano. The motor 1, together with the fabric straps 189, the block 190, and the fabric loop 195 comprise a unit readily interchangeable in the piano.

The operation of the player piano is as follows:

The music roll is inserted in the tracker box and the end of the sheet is secured to the take-up roll 176, which is revolved sufficiently by hand to oscillate the bell crank rod 179, thereby placing the electric switch in condition to be closed upon operation of the tempo control mechanism. The tempo lever 142 is pushed to the left, against the spring tension of the tempo return pneumatic 146, and held there momentarily. This permits the electric switch to close by gravity and opens the tempo valve 80, leading to the air motor, resulting in the driving of the pump 3, by the electric motor 1, and the simultaneous operation of the air motor. The suction from the pump 3 retracts the return pneumatics 146 and 153, leaving the tempo and reroll controls free for operation.

The expression mechanism is controlled automatically from the tracker bar, as previously described, for obtaining pressure variations at the pneumatic action and corresponding changes in volume of tone. The expression mechanism is also controllable manually from the expression pedal 33 through the resilient engagement of the leaf spring 35 with the main pressure regulator 13. The treble or bass pressure regulators 84 and 85 are controllable from the tracker bar or key bed, to obtain relative variations of tone volume, between the two halves of the piano. The expression mechanism and the treble and bass regulators can be made entirely subject to manual control by manipulation of the lever 158, and consequent shifting of the slide valve 58, to sever these mechanisms from their respective perforations in the tracker bar. The sustain is likewise controllable automatically from the tracker bar, and manually from both a button valve in the key bed and a sustain pedal. The hammer rail pneumatic shifts the hammer rail in concurrence with pressure variations at the pneumatic action and by changing the hammer stroke greatly augments the changes in volume of tone upon pressure variations by either the expression mechanism or the treble or bass regulators.

When the sheet is entirely played a series of perforations therein uncover the reroll perforation 134', contracting the reroll pneumatic 130, shifting the reroll gearing at the tracker box, shifting the pump valves 9 and 9' and thereby cutting off the pneumatic action from the pump and admitting a high suction pressure to the air motor for rapid rerolling of the sheet. The above action can also be effected manually by operation of the reroll by manual operation of the reroll lever, which is arranged to thereby open a suitable valve, admitting atmospheric pressure to the reroll pneumatic 130. When the sheet is nearly rewound a series of repeat perforations coincide with the repeat perforation 135' in the tracker bar and if the stop valve 136 is open the repeat pneumatic 131 is thereupon collapsed, with a consequent reshifting of the reroll gearing and pump valve to a playing position. By opening the stop valve 136, after the player is in operation, a music roll may be made to replay an indefinite number of times. With the stop valve 136 closed the operation of rerolling is completed, the sheet leaving the take-up roll 176, permitting the bell crank rod 179 to throw open the electric switch. With the cessation of suction from the pump 3, the return pneumatics 146 and 153 return the tempo and reroll controls to their normal positions, the return pneumatic 122 retracts the hammer rail 118, and thru the movement of the rod 185 upon the return of the tempo control, the closure of the electric switch is made dependent upon the position of the tempo control.

I do not intend to be limited to the precise construction or arrangement of my player piano, as illustrated and described.

I claim:

1. In a player piano, the combination of a tracker bar, a pressure regulator comprising a suction responsive member, a valve controlled by the position of said suction responsive member, means for directly subjecting said suction responsive member to suction at predetermined intervals for actuating said valve, said latter means being controlled from said tracker bar, pneumatic operating means having mechanical connection with said suction responsive member for actuating the latter, and means controlled from said tracker bar for controlling admission of suction to said pneumatic operating means.

2. In a player piano, a tracker bar, a pressure regulator, a diaphragm governing said regulator, said diaphragm being controlled by differential pressures upon the opposite sides thereof, a lever for operating said pressure regulator, pneumatic means controlled from said tracker bar for actuating said lever, and pneumatic means controlled from said tracker bar for varying one of said differential pressures acting upon said diaphragm.

3. In a player piano, the combination of a tracker bar, a pressure regulator, means connecting said regulator with the source of suction and with the pneumatic action, said regulator comprising valve means for throttling the suction communication between said source of suction and said pneumatic action, a suction responsive surface governing said regulator, said suction responsive surface being controlled by differential pressures upon opposite sides thereof, one side of said surface being normally subjected to suction and means controlled from said tracker bar for governing said pressure regulator through the medium of a suction imposed upon the other side of the surface.

4. In a player piano, the combination of a tracker bar, a source of suction, pneumatic operating mechanism, a suction conduit connecting said source of suction with said pneumatic operating mechanism, a pressure regulator interposed in said conduit, said pressure regulator comprising valve means for restricting or enlarging the area of suction communication through said conduit, a suction responsive surface controlling said regulator, said suction responsive surface normally having a constant pressure upon one side thereof, and means controlled from said tracker bar for varying the pressure on said one side.

5. In a player piano, a pneumatic action, a source of suction, a passage connecting said pneumatic action and said source of suction, a valve in said passage for controlling the suction pressure of said pneumatic action, suction responsive means for controlling said valve, and means for subjecting said suction responsive means to different degrees of suction pressure independently of the position of said valve and independently of variations of suction at said source of suction.

6. In a player piano, the combination of a tracker bar, a pneumatic action, a source of suction, a suction conduit connecting said source of suction with said pneumatic action, a pressure regulator interposed in said conduit, said pressure regulator comprising valve means for restricting or enlarging the area of suction communication through said conduit, a lever for operating said pressure regulator, and pneumatic means controlled from said tracker bar for actuating said lever.

7. In a player piano, the combination of a tracker bar, a source of suction, pneumatic operating mechanism, a suction conduit connecting said source of suction with said pneumatic operating mechanism, a pressure regulator interposed in said conduit, said pressure regulator comprising valve means for controlling the area of suction communication through said conduit, a lever for controlling said pressure regulator, and a plurality of pneumatic mechanisms connected to said lever, said pneumatic mechanisms being controlled from said tracker bar.

8. In a player piano, the combination of a tracker bar, a pneumatic action, a source of suction, a suction conduit connecting said source of suction with said pneumatic action, a pressure regulator interposed in said conduit, said pressure regulator comprising valve means for restricting or enlarging the area of suction communication through said conduit, a lever for operating said pressure regulator, a plurality of diaphragms connected to said lever, said diaphragms having different lengths of operating arms on said lever, and means controlled from said tracker bar for operating said diaphragms either selectively or in combination.

9. In a player piano, a pressure regulator, means for controlling said regulator, said means being pneumatically operated by the application of different suction pressures thereto, said different suction pressures being effective upon said latter means independently of the position of said regulator.

10. In a player piano, a pneumatic action, a pressure regulator for controlling the pressure at said pneumatic action, said pressure regulator normally supplying a constant predetermined suction pressure at said pneumatic action, pressure controlled means for governing said pressure regulator, and means for automatically varying the degree of suction pressure applied to said pressure controlled means independently of the position of said regulator for obtaining a variation of suction pressures at the pneumatic action.

11. In a player piano, a pneumatic action, a pressure regulator for controlling the pressure at said pneumatic action, means governed by differential pressures acting thereupon for controlling said regulator and means for subjecting said latter means to different suction pressures which are independent of the suction pressures prevailing at the pneumatic action side of the regulator.

12. In a player piano, a main pressure regulator, a subsidiary pressure regulator, a plurality of suction responsive mechanisms for governing said main pressure regulator and valve means for connecting said suction responsive mechanisms to said subsidiary pressure regulator.

13. In an expression mechanism for player pianos, the combination of a source of suction, a pneumatic action, a suction conduit connecting said source of suction with said pneumatic action, a pressure regulator interposed in said conduit, said pressure regulator comprising valve means for restricting or enlarging the area of suction communication through said conduit, a lever for controlling said pressure regulator, a suction responsive surface connected to said lever, and a valve for admitting suction pressure on one side of said suction responsive surface.

14. In an expression mechanism for player pianos, the combination of a source of suction, a pneumatic action, a suction conduit connecting said source of suction with said pneumatic action, a pressure regulator interposed in said conduit, said pressure regulator comprising valve means for restricting or enlarging the area of suction communication through said conduit, a suction responsive device for controlling said pressure regulator, said suction responsive device normally having atmospheric pressure acting thereupon, and automatic means for applying suction pressure to said suction responsive device.

15. In an expression mechanism for player pianos, a high pressure channel, a low pressure channel, a pressure regulator, pressure controlled means for governing said regulator, and valve means for connecting said pressure controlled means to said high pressure channel or to said low pressure channel.

16. In an expression mechanism for player pianos, a pressure regulator, a pressure responsive device controlling said regulator, said device being normally subject to atmospheric pressure and means for supplying different suction pressures to said device.

17. The combination of a pressure regulator to control the suction pressure in a pneumatic action, a spring acting on said regulator to normally furnish a low suction pressure in said pneumatic action, a manually actuated member adapted to act on said regulator and spring means cooperating with said member whereby the initial actuation of said member impresses an increasing resilient tension on said regulator to open the same gradually, the final actuation of said member obtaining a direct mechanical opening of said regulator independently of any resilient tension through said spring means.

18. In combination, a pressure regulator for player pianos, a manually actuated member, spring means connecting said member to said pressure regulator, said spring means affording an increasing tensional engagement between said member and said regulator upon the initial movement of said member, said member exerting an unyielding engagement between said member and said regulator upon the final movement of said member.

19. In a player piano, a pneumatic motor, a source of suction for said pneumatic motor, said suction being fluctuating in pressure, and a pressure regulator between said pneumatic motor and said source of suction, said regulator comprising two suction responsive surfaces acting in opposition to each other for controlling said regulator, said surfaces being of differential areas and being subjected to differential suctions on the inlet and outlet sides of said regulator.

20. In a player piano, a suction pump, expression mechanism connected to said pump, said expression mechanism producing fluctuating suction pressures, a pressure regulator connected to said expression mechanism, said pressure regulator transmitting fractional parts of pressure peaks therethru, and a pneumatic motor connected to said pressure regulator.

21. In a player piano, the combination of a tracker bar, an expression mechanism, a treble pressure regulator, said tracker bar having perforations therein for controlling said expression mechanism and said treble pressure regulator, a plurality of conduits extending from the perforations in said tracker bar to said expression mechanism and to said treble pressure regulator, and means for simultaneously interrupting communication between the perforations in said tracker bar and said expression mechanism and treble pressure regulator.

22. In combination, a tracker bar, an expression mechanism, auxiliary pneumatic operating mechanism, perforations in said tracker bar for controlling said expression mechanism and said auxiliary pneumatic operating mechanism, said expression mechanism comprising a casing embodying pneumatic units having a plurality of control ducts therefor, a slide valve slidable along said casing having tube openings, certain of said tube openings being adapted to register with said control ducts, tubes leading from the perforations in said tracker bar to the tube openings in said slide valve, and tubes leading from other of said tube openings to said auxiliary pneumatic operating mechanism.

23. In combination, a tracker bar, an expression mechanism, a treble pressure regulator, a plurality of pneumatic tubes extending from said tracker bar to said expression mechanism, and to said treble pressure regulator, and valve means for simultaneously connecting and disconnecting said tubes with said expression mechanism and with said treble pressure regulator.

24. In a player piano, the combination of a pneumatic action, an expression mechanism adapted to deliver a range of different suction pressures to said pneumatic action, a pressure regulator between said pneumatic action and said expression mechanism, said pressure regulator being operable to reduce said different suction pressures.

25. In a player piano, the combination of a pneumatic action, an expression mechanism adapted to deliver a range of different suction pressures to said pneumatic action, a pressure regulator between said pneumatic action and said expression mechanism, said pressure regulator comprising a first diaphragm, a second diaphragm, arranged to oppose said first diaphragm, a valve between said diaphragms and controlled thereby, the suction pressure from the expression mechanism being effective upon said first diaphragm, the suction pressure from said pneumatic action being active upon said section valve, said diaphragm having differential areas to secure a drop of suction pressure thru said regulator.

26. In a player piano, a tracker bar, a pneumatic action, an expression mechanism adapted to deliver a range of suction pressures to said pneumatic action, said expression mechanism being controlled from said tracker bar, and a pressure regulator between said pneumatic action and said expression mechanism, said pressure regulator comprising a first diaphragm having communication with said expression mechanism, a second diaphragm arranged to oppose first diaphragm, said second diaphragm having communication with said pneumatic action, a valve between said diaphragms and controlled thereby, said second diaphragm normally being neutralized by equal suction pressures acting on both sides thereof, and valve means controllable either manually or from said tracker bar for admitting atmospheric pressure upon one side of said second diaphragm.

27. In a player piano, the combination of a source of suction, a pneumatic action, a tracker bar, an expression mechanism, adapted to deliver a range of different suction pressures to said pneumatic action, said expression mechanism being controlled from said tracker bar, and a pressure regulator connected between said pneumatic action and said expression mechanism for reducing said different suction pressures, said pressure regulator comprising a relatively small diaphragm having communication with said expression mechanism, a relatively large diaphragm aranged to oppose said small diaphragm, said large diaphragm having communication with said pneumatic action, a multiple valve between said diaphragms and controlled thereby, spring means tending to retain said valve in an open position, said large diaphragm normally being neutralized by suction pressures acting upon both sides thereof, and a pneumatic valve controlled from said tracker bar for admitting atmospheric pressure upon one side of said large diaphragm, the differential areas of said diaphragms thereupon acting to limit the degree of valve opening.

28. In a player piano, a pneumatic action, an expression mechanism adapted to deliver a range of different suction pressures to said pneumatic action, a pneumatic motor receiving suction pressure for said expression mechanism, a pressure regulator between said pneumatic motor and said expression mechanism for reducing the peaks of said undulating suction pressures, said pressure regulator comprising a valve chamber, a diaphragm chamber, a valve separating said chambers, and a diaphragm in said latter chamber and having connection with said valve, the undulating suction pressure from said expression mechanism having communication with said valve chamber and tending to unseat said valve, the suction pressure from said pneumatic motor having communication with said diaphragm chamber and tending to seat said valve.

29. In a player piano, the combination of a tracker bar, a source of suction, a pneumatic action, a suction passage connecting said pneumatic action with said source of suction, an expression mechanism comprising a valve interposed in said suction passage for controlling the same, suction responsive means for actuating said valve, and means operating under the control of perforations in said tracker bar for subjecting said suction responsive means to different degrees of suction pressure, said latter means admitting said different degrees of suction pressure to said suction responsive means independently of the position of said valve.

30. In a player piano, the combination of a tracker bar, a source of suction, a pneumatic action, a suction passage connecting said pneumatic action with said source of suction, an expression mechanism comprising a valve interposed in said suction passage for throttling the same, a plurality of diaphragm pouch units operative to control said valve, said pouch units being controlled from perforations in said tracker bar, and lever mechanism connecting said pouch units with said valve, said pouch units having different ratios of leverage for operating said valve.

31. In a player piano, the combination of a tracker bar, a source of suction, a pneumatic action, a suction passage connecting said pneumatic action with said source of suction, an expression mechanism comprising a valve interposed in said suction passage for controlling the same, control mechanism operable to mechanically control said valve, additional control mechanism operable to pneumatically control said valve, both of said control mechanisms being selectively and simultaneously operated from perforations in said tracker bar.

32. In a player piano, the combination of a tracker bar, an expression mechanism comprising a valve characterized by a plurality of flexible members having a common passage therethru, said flexible members being arranged serially and interconnected at their alternate edges or corners to afford simultaneously operating multiple valve openings, and a plurality of pneumatic controls operated automatically from said tracker board for controlling the position of said valve.

33. In a player piano, the combination of a tracker bar, an expression mechanism comprising a valve characterized by a plurality of flexible members interconnected at their edges or corners, and adapted to be separated to afford multiple valve openings, and pneumatic devices automatically controlled from said tracker bar for controlling the position of said valve.

34. In a player piano, the combination of an expression mechanism comprising a valve characterized by a plurality of flexible valve members, said valve members being separable to afford a plurality of simultaneously operable valve openings, and a plurality of pneumatic devices for controlling the position of said valve.

35. In a player piano, the combination of an expression mechanism comprising a valve characterized by a plurality of valve members, said valve members being separable to afford a plurality of valve openings, and means for controlling the position of said valve.

36. In a player piano, the combination of a tracker bar adapted to receive a note sheet, a source of suction, a pneumatic action, a conduit connecting said source of suction with said pneumatic action, an expression mechanism for controlling the effective suction pressure at said pneumatic action by throttling said conduit, pneumatic means for operating said expression mechanism, a first suction conduit having a relatively high suction pressure therein, a second suction conduit having a relatively low suction pressure therein, and control means selectively operable automatically by expression perforations in the note sheet for connecting either of said suction conduits with said pneumatic means for controlling the operation of said expression mechanism.

In witness whereof, I hereunto subscribe my name this 15th day of September, A. D. 1917.

WILLIAM F. COOPER.